United States Patent [19]
Rothe

[11] Patent Number: 4,645,311
[45] Date of Patent: Feb. 24, 1987

[54] SCANNING OBJECTIVE

[75] Inventor: Ernst Rothe, Munich, Fed. Rep. of Germany

[73] Assignee: Optische Werke G. Rodenstock, Fed. Rep. of Germany

[21] Appl. No.: 499,792

[22] Filed: May 31, 1983

[30] Foreign Application Priority Data

May 29, 1982 [DE] Fed. Rep. of Germany ....... 3220408

[51] Int. Cl.$^4$ .......................... G02B 9/06; G02B 9/12; G02B 13/18
[52] U.S. Cl. ..................................... 350/432; 350/478; 350/480
[58] Field of Search .................... 350/432, 478, 480

[56] References Cited

U.S. PATENT DOCUMENTS

| 697,959 | 4/1902 | Abbe | 350/432 |
| 2,637,242 | 5/1953 | Osterberg et al. | 350/432 |
| 4,352,541 | 10/1982 | Minoura et al. | 350/432 |

*Primary Examiner*—John K. Corbin
*Assistant Examiner*—Rebecca D. Gass
*Attorney, Agent, or Firm*—Barnes & Thornburg

[57] ABSTRACT

A scanning objective with two optical elements, which includes at least one aspherical surface; the aspherical surface is so constructed that in comparison with a spherical surface with the same vertex radius of curvature, the thickness of the lens increases toward the outside. By this construction of the aspherical surface in accordance with the present invention, for example, a scanning objective with two lenses and an aspherical surface can be obtained which is limited in diffraction for small image scales.

18 Claims, 5 Drawing Figures

SCANNING OBJECTIVE

The present invention relates to a scanning objective.

Scanning objectives are needed, for example, for the optical information storage, for so-called "image record players" or for "compact record players." Depending on the field of use, the image scale $\beta$ is thereby small, which means its absolute value lies between 0 and 0.2, or $|\beta|$ may assume values up to 1.

For purposes of increasing the recording density, the scanning objective should be corrected as well as possible—a "limited diffraction" objective would be desirable. Depending on the used scanning light source (semiconductors or laser diodes) and field of use, the scanning objective must thereby be corrected for a certain wavelength or over a wavelength range.

Known monochromatically corrected scanning objectives with good image output thereby include at least four lenses. As a result thereof, these scanning objectives are not only expensive in the manufacture but also comparatively large and heavy. It is therefore difficult to reduce the dimensions, for example, of an image record player; the forces due to inertia also become disadvantageously large with rapid control movements of the objective.

The present invention is therefore concerned with the task to provide a compact and light-weight scanning objective favorable from a manufacturing point of view which is limited in diffraction in "monochromatic application."

The underlying problems are solved in accordance with the present invention for small image scales $\beta$ ($\beta = 0.0 \ldots -0.2$) in that the scanning objective includes two lenses with positive power of refraction, of which the first lens has an aspherical surface in the direction of incidence of the rays which is so constructed that in comparison to a spherical surface with the same vertex radius of curvature, the thickness of the lens increases toward the outside. For larger image scales ($|\beta| < 1$) the underlying problems are solved in accordance with the present invention in that the scanning objective includes two optical elements with positive power refraction which are both provided with an aspherical surface so constructed that in comparison with a spherical surface having the same vertex radius of curvature, the thickness of the lens increases toward the outside and in which the respective surface on the side of the layer intercept length is curved more strongly. Alternatively the first optical element, as viewed in the direction of incidence of the rays, consists of a lens which has an aspherical surface so constructed that in comparison with a spherical surface with the same vertex radius of curvature, the thickness of the lens increases toward the outside and the second optical element consists of two lenses. The scanning objective according to the present invention for small image scales consists only of two lenses and is characterized in particular in that the lens arranged on the side of the long intercept length, i.e., the first lens in the direction of incidence of the rays, has an aspherical surface. This aspherical surface is so constructed that with a positive radius for the lens material (glass or plastic material), the curvature becomes weaker toward the outside and with negative radius for the lens material, the curvature becomes stronger toward the outside.

In a practical scanning objective with limited diffraction, certain conditions exist not only for the focal length f', the intercept length s' on the side of the image and the image scale b, but also the spherical aberration, the asymmetry error (Koma) and the astigmatism of third order as well as the spherical aberration and the asymmetry error of fifth order have to be corrected. (The image field curvature can be neglected by reason of the small image angle as well as possibly also by reason of the automatic focusing.)

With a two-lens objective nine variables are available for fulfilling the aforementioned conditions, respectively, correction, namely, four radii, two lens thicknesses, two indices of refraction and an air spacing. (The Abbe numbers play no significant role since the objective is to be corrected only monochromatically, respectively, is to be corrected only for a very narrow spectral range.) Of these nine variables, however, the lens thicknesses and the indices of refraction are of little help so that for fulfilling the eight conditions, only five variables, respectively, with a two-lens objective having an aspherical surface, six variables remain.

It has been surprisingly discovered that with image scales $\beta$ between about 0 and $-0.2$ the correction is possible with an aspherical surface constructed in accordance with the present invention.

Even under extreme requirements as regards image scale, aperture and image angle, it has been discovered that the fulfillment of the eight conditions is possible by seven variables if the objective is constructed in such a manner that each lens has an aspherical surface with the shape in accordance with the present invention. In particular the correction of the astigmatism of third order and the asymmetry error of fifth order are further improved by the second aspherical surface. The astigmatism and the asymmetry error are further improved by this strong curvature of the lens surfaces on the side of the larger intercept length.

A further solution of the present invention for larger image scales resides in providing an objective consisting of two optical elements, of which the first optical element consists of a single lens and the second optical element consists of two lenses, whereby the first optical element again has an aspherical surface so constructed that in comparison with a spherical surface with the same vertex radius of curvature, the thickness of the lens increases toward the outside. In this objective, two spherical lenses are used instead of a single aspherical lens. It is possible thereby in particular to utilize glasses with a lower index of refraction, i.e., glasses which are more favorable from a cost point of view.

Ranges for the curvatures $\phi_i$ ($=1/R_i$) of the four lens surfaces and of the air spacing of the two lenses as a function of the intercept length s' (f' = 1) as well as of the lens thicknesses $l_1$ and $l_3$ and of the indices of refraction for scanning objectives designed for small image scales may be as follows:

| s'       | 0.2   | 0.3   | 0.4   | 0.5   | 0.6   | 0.7   | 0.8   | 0.9   |
|----------|-------|-------|-------|-------|-------|-------|-------|-------|
| $\phi_1$ | 0.85  | 0.8   | 0.75  | 0.7   | 0.65  | 0.6   | 0.55  | 0.47  |
| $\phi_2$ | −0.25 | −.012 | −0.06 | −0.04 | −0.05 | −0.04 | 0.04  | 0.35  |
| $\phi_3$ | 1.15  | 1.1   | 1.0   | 0.8   | 0.6   | 0.35  | 0.27  | 0.25  |
| $\phi_4$ | −0.3  | −0.2  | −0.22 | −0.33 | −0.5  | −0.68 | −0.85 | −1.04 |
| $\phi_2$ | 0.86  | 0.8   | 0.69  | 0.57  | 0.47  | 0.36  | 0.24  | 0.14  | where $\phi_1$, $\phi_2$, $\phi_3$ and $\phi_4$ are the curvature of the lens surfaces and $l_2$ the air spacing of the two lenses (1, 2) as a function of the intercept length s' with a focal distance f normalized to 1, whereby the tolerances of the curvatures and of the air spacing are ±0.25 (l>0), and the thickness ($l_1$) of the first lens $l_1=0.35$ with tolerances of +0.3 and −0.2 and the thickness ($l_3$) of the second lens $l_3=0.25$ with tolerances of +0.3 and −0.2 and of the indices of refraction $n_1$, $n_3=1.7\pm0.2$. The intercept length s' being the distance from the last lens surface to the image.

Examples of advantageous constructions of the aspherical surface respectively of the two aspherical surfaces are as follows:

If the diameter is reduced by one half, the deviation of the aspherical surface from a spherical surface with the same vertex radius of curvature ($\Delta$ surface distance measured in the direction of the optical axis) is reduced by a factor greater than 4, whereby this factor decreases from the outside toward the inside and lies between about 8 and 80 for edge and half diameter and between about 5 and 50 for half and quarter diameter.

Examples of the relative deviations $\Delta z$ of the aspherical surface from a spherical surface with the same vertex radius of curvature are as follows:

| h | 0.1 | 0.2 | 0.3 | 0.4 | 0.5 | 0.6 |
|---|---|---|---|---|---|---|
| $\Delta z$ | 0.005 | 0.03 | 0.11 | 0.4 | 1.0 | 2.2 | whereby the focal distance f as well as the relative deviation $\Delta z$ ($\Delta$ surface spacing measured in the direction of the optical axis) are normalized to 1 with a distance h from the optical axis of 0.5.

In particular, the correction of the asymmetry error of the fifth order is further improved by the construction of the first surface of the first lens as aspherical surface.

Moreover, the large number of possible embodiments indicated by Tables 1–3 hereinafter clearly demonstrates the existence of a true constructional principle of universal applicability as defined in claims 1–3 which makes possible the creation of well-corrected scanning objectives.

These and further objects, features and advantages of the present invention will become more apparent from the following description, when taken in connection with the accompanying drawing which shows, for purposes of illustration only, several embodiments in accordance with the present invention, and wherein.

Figure 1:
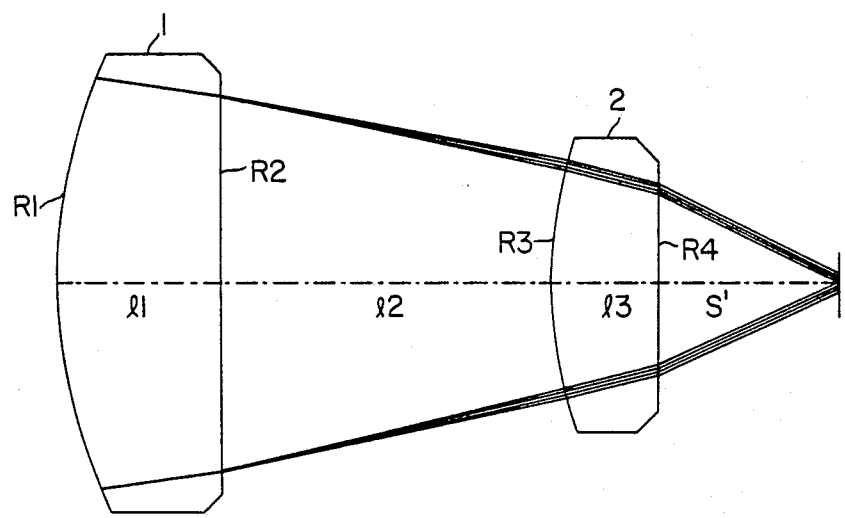
FIG. 1 is a somewhat schematic cross sectional view through an objective in accordance with the present invention with two lenses.
Figure 2:
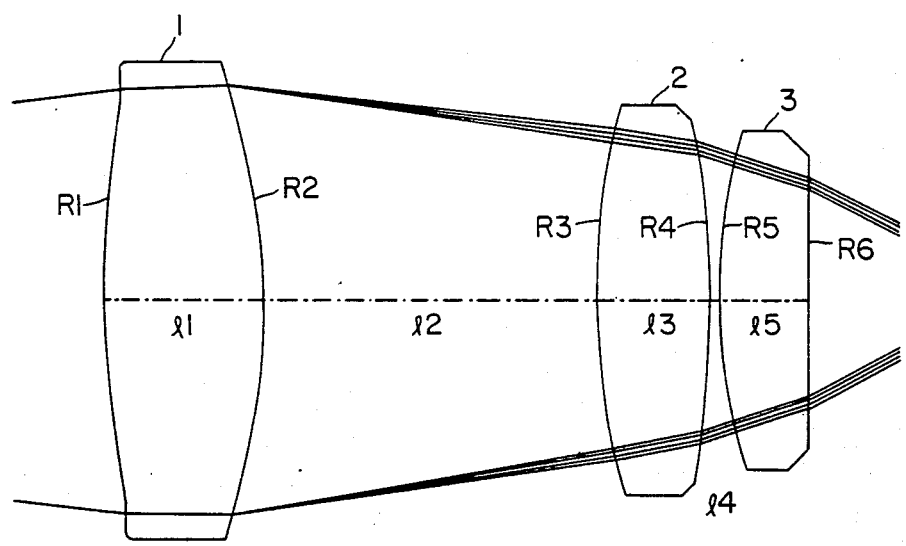
FIG. 2 is a somewhat schematic cross sectional view through an objective in accordance with the present invention with three lenses.

Referring now to the drawing wherein like reference numerals are used throughout the various views to designate like parts, FIGS. 1 and 2 illustrate for purposes of explanation of the used designations, cross sections through scanning objectives in accordance with the present invention with two, respectively, three lenses. The radii of the lens surfaces are designated by reference character Ri (i=1 . . . 4, respectively, 6), the lens thicknesses with $l_1$, $l_3$ and $l_5$, the air spacing with $l_2$ and $l_4$ and the indices of refraction with n1, n3, respectively, n5. The lens surfaces are numbered in the direction of the scanning beam.

The numerical data of specific embodiments are indicated in Tables 1 to 3, and with one lens having one aspherical surface in examples 1–20 and two aspherical surfaces in examples 21–23 more particularly in Table 1, the data of objectives with two lenses and a single aspherical surface, in Table 2, the data of objectives with two lenses having two aspherical surfaces and in Table 3, the data of objectives with three lenses and one aspherical surface. Furthermore, there is also indicated in these Tables how large the intercept length s' is, and which surface (respectively, surfaces) are constructed aspherically.

In some embodiments, a further surface is additionally constructed aspherically. The aspherical surfaces are represented by the following equation:

$$z = \phi h^2/(1 + \sqrt{1 - (K + 1)\phi^2 h^2}) + AC4 \cdot h^4 + AC6 \cdot h^6 + AC8 \cdot h^8 + AC10 \cdot h^{10}$$

where
h is the distance of a surface point from the optical axis z is the meniscus height, i.e., the distance measured in the direction of the optical axis between the surface vertex and a surface point with the distance h from the optical axis $\phi(=1/R)$ is the curvature in the surface vertex, and K, AC4, AC6, AC8 and AC10 are the aspherical coefficients.

The aspherical coefficients belonging to a certain surface are also indicated in the Tables.

In these Tables 1–3, the focal length f is normalized to 10 in all embodiments. In typical applications, however, the focal length amounts to between 3 and 15 mm., the numerical aperture lies between 0.3 and about 0.7, the image angle between about 1° and 4° and the image scale $\beta$ between 0 and −1:1.

The objectives are corrected for monochromatic application, respectively for a very narrow spectral range, for example, for the range between 790 nm and 810 nm.

Furthermore, objectives constructed in practice may also deviate from the embodiments indicated in the tables as regards their data insofar as the deviating objectives have a similar correction condition; these deviations are typically within a range of about ±5% of the data indicated in the Tables.

Figure 3:
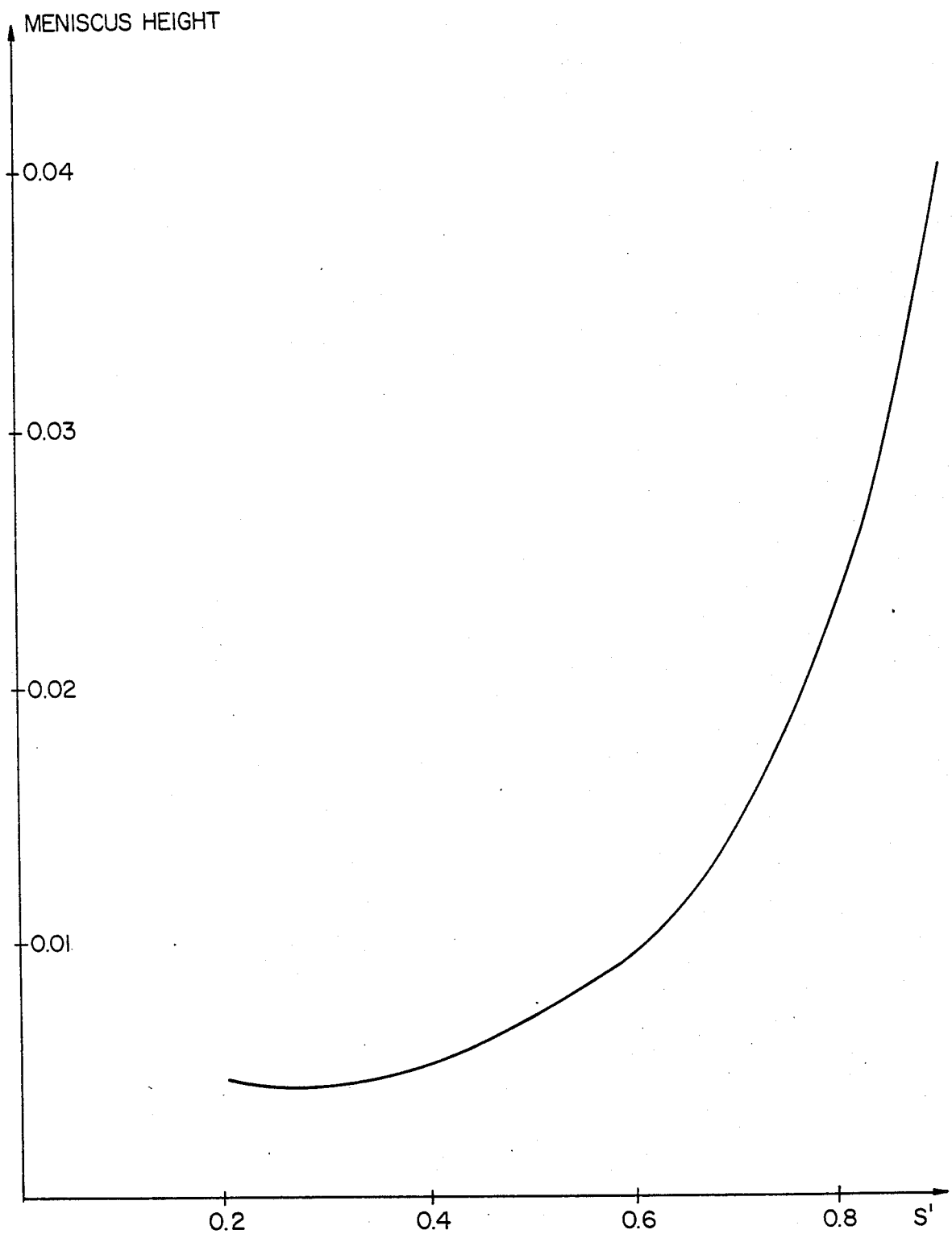
FIG. 3 is a diagram showing the meniscus height difference $\Delta z$ between a spherical surface in accordance with the present invention and a spherical surface with the same vertex refraction as a function of the intercept length s'.

FIG. 3 illustrates typical values for the distance measured in the direction of the optical axis between an aspherical surface constructed in accordance with the present invention and a spherical surface with the same vertex radius of curvature as a function of the intercept length s' with a numerical aperture sin u'=0.45 (focal distance f normalized to 1). Actual values may deviate from the illustrated curve by +100% and −50%.

Figure 4:
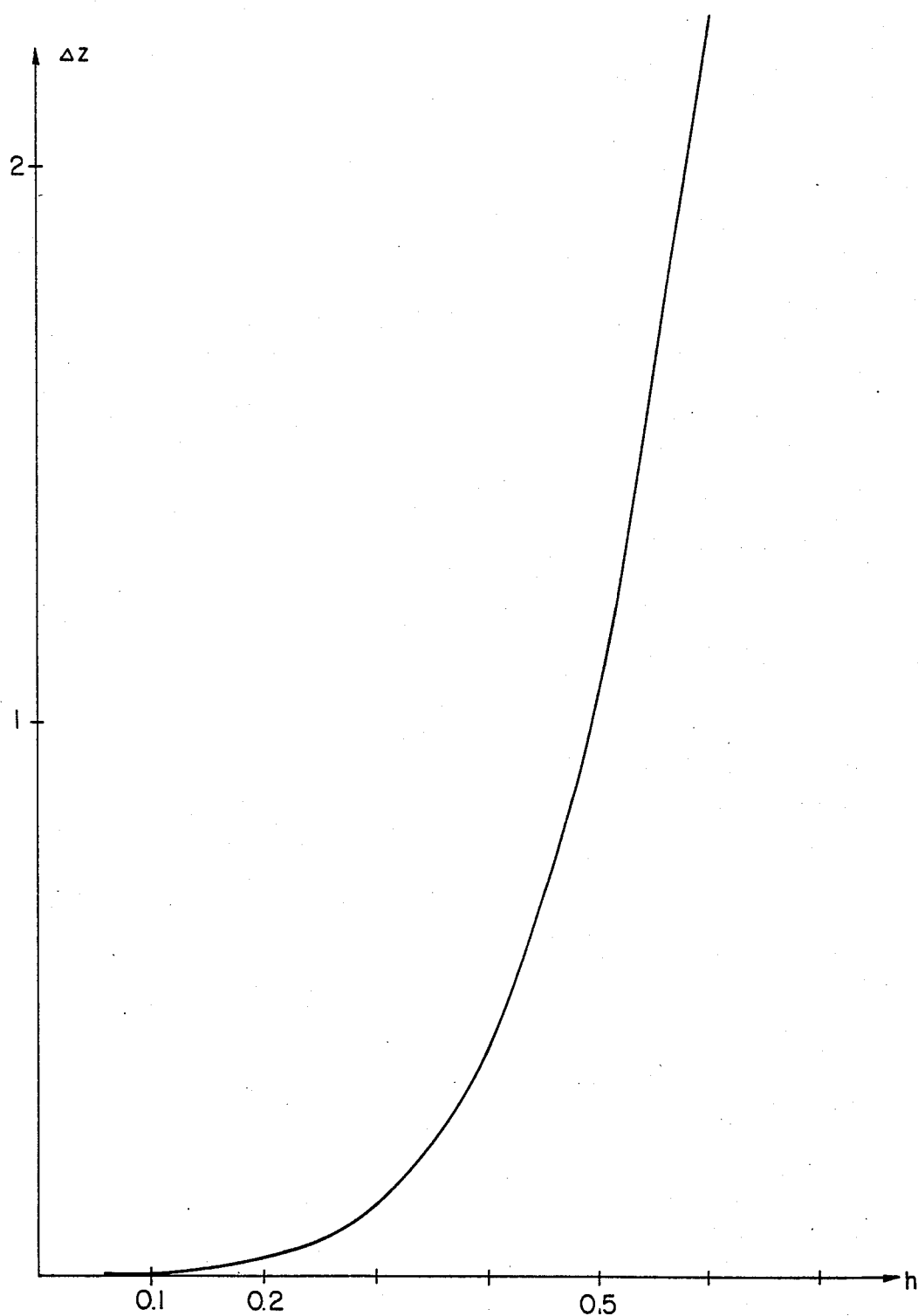
FIG. 4 is a diagram illustrating the relative deviation of the apsherical surface from a spherical surface with the same vertex refraction as a function of the beam height h.

FIG. 4 illustrates typical values for the distance measured in the direction of the optical axis between an aspherical surface in accordance with the present invention and a spherical surface with the same vertex radius of curvature as a function of the distance h from the optical axis (beam height h). With a value of the beam height h that is equal to half the focal distance (0.5 with focal distance normalized to 1), the distance between the two surfaces is normalized to 1.

Figure 5:
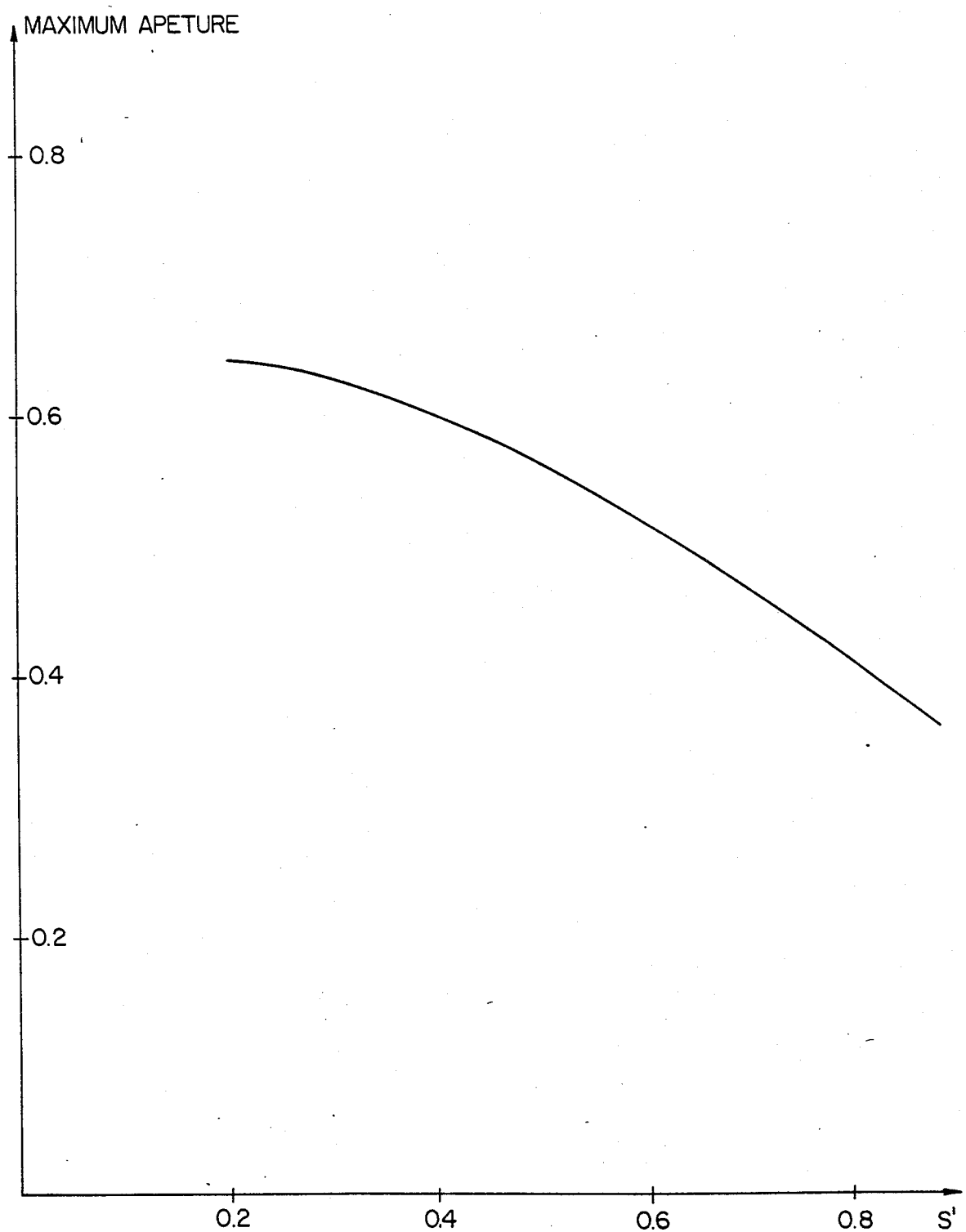
FIG. 5 is a diagram illustrating the maximum aperture as a function of the intercept length s'.

In FIG. 5, the numerical aperture sin u' is illustrated as a function of the inercept length s' for a two lens objective with one aspherical surface.

TABLE 1

| Example | R1 | R2 | R3 | R4 | l1 | l2 | l3 | s' | n1 | n3 | aspher surface R |
|---|---|---|---|---|---|---|---|---|---|---|---|
| 1 | 12.82 | −335.05 | 9.52 | −206.94 | 3.5 | 7.28 | 4.0 | 4.0 | 1.51 | 1.89 | 1 |
| 2 | 12.82 | −61.57 | 9.52 | −50.66 | 3.5 | 7.94 | 1.0 | 4.0 | 1.61 | 1.79 | 1 |
| 3 | 12.2 | −419.27 | 9.52 | −55.87 | 1.5 | 8.25 | 2.5 | 4.0 | 1.61 | 1.78 | 1 |
| 4 | 11.49 | −42.56 | 9.52 | −24.30 | 3.5 | 6.48 | 2.5 | 4.0 | 1.51 | 1.61 | 1 |
| 5 | 14.29 | 410.64 | 11.76 | −46.65 | 3.5 | 7.04 | 2.5 | 4.0 | 1.78 | 1.89 | 1 |
| 6 | 13.89 | −65.76 | 11.76 | −41.99 | 3.5 | 7.4 | 2.5 | 4.0 | 1.61 | 1.89 | 1 |
| 7 | 11.76 | 51.12 | 6.9 | 29.92 | 3.5 | 8.31 | 2.5 | 4.0 | 1.61 | 1.89 | 1 |
| 8 | 12.82 | −178.88 | 9.52 | −58.61 | 3.5 | 7.27 | 2.5 | 4.0 | 1.61 | 1.79 | 1 |
| 9 | 17.09 | −51.18 | 66.67 | −12.51 | 3.5 | 3.14 | 2.5 | 7.0 | 1.61 | 1.79 | 1 |
| 10 | 14.93 | 61.09 | 16.67 | −18.49 | 3.5 | 3.57 | 2.5 | 7.0 | 1.61 | 1.79 | 1 |
| 11 | 17.24 | −99.39 | 28.57 | −17.24 | 3.5 | 4.66 | 1.0 | 7.0 | 1.61 | 1.89 | 1 |
| 12 | 17.24 | −272.17 | 28.57 | −16.35 | 1.5 | 4.99 | 2.5 | 7.0 | 1.61 | 1.89 | 1 |
| 13 | 16.67 | −63.99 | 28.57 | −16.72 | 3.5 | 3.85 | 2.5 | 7.0 | 1.51 | 1.89 | 1 |
| 14 | 13.51 | −57.53 | 28.57 | −11.13 | 3.5 | 2.49 | 2.5 | 7.0 | 1.51 | 1.60 | 1 |
| 15 | 16.67 | −165.71 | 28.57 | −14.44 | 3.5 | 3.41 | 2.5 | 7.0 | 1.61 | 1.79 | 1 |
| 16 | 8.33 | 22.65 | 12.5 | −39.13 | 3.5 | 4.32 | 2.5 | 5 | 1.61 | 1.79 | 2 |
| 17 | 9.70 | 26.73 | 10.0 | −54.65 | 3.5 | 5.49 | 2.5 | 5 | 1.61 | 1.79 | 2 |
| 18 | 9.71 | 53.47 | 12.5 | −24.42 | 4.5 | 5.08 | 2.5 | 5.0 | 1.51 | 1.79 | 2 |
| 19 | 9.71 | 49.64 | 12.5 | −49.7 | 3.5 | 6.10 | 1.0 | 5.0 | 1.61 | 1.89 | 2 |
| 20 | 9.71 | 34.59 | 12.5 | −29.75 | 3.5 | 5.15 | 2.5 | 5.0 | 1.61 | 1.79 | 2 |
| 21 | 11.97 | 1048.1 | 9.52 | −46.56 | 3.5 | 7.4 | 2.5 | 3.9 | 1.61 | 1.79 | 1 2 |
| 22 | 9.64 | 29.41 | 12.5 | −28.51 | 3.5 | 5. | 2.5 | 5.19 | 1.61 | 1.79 | 1 2 |
| 23 | 7.07 | 12.12 | 15.87 | −22.22 | 3.5 | 2.8 | 2.5 | 5.77 | 1.61 | 1.79 | 1 2 |

| Example | K | AC4 | AC6 | AC8 | AC10 |
|---|---|---|---|---|---|
| 1 | −1.817 | 0 | −0.7964 E-06 | 0 | 0 |
| 2 | −2.104 | 0 | −0.926 E-06 | 0 | 0 |
| 3 | −1.594 | 0 | −0.742 E-06 | 0 | 0 |
| 4 | −2.033 | 0 | −0.137 E-05 | 0 | 0 |
| 5 | −1.912 | 0 | −0.620 E-06 | 0 | 0 |
| 6 | −2.550 | 0 | −0.997 E-06 | 0 | 0 |
| 7 | −0.937 | 0 | −0.338 E-06 | 0 | 0 |
| 8 | −1.796 | 0 | −0.766 E-06 | 0 | 0 |
| 9 | −0.911 | −0.3 E-3 | −0.269 E-05 | −0.709 E-07 | 0 |
| 10 | 1.801 | −0.30 E-3 | −0.247 E-05 | −0.464 E-07 | 0 |
| 11 | 1.688 | −0.30 E-3 | −0.2155 E-05 | −0.417 E-07 | 0 |
| 12 | 1.505 | −0.30 E-3 | −0.2256 E-05 | −0.456 E-07 | 0 |
| 13 | 0.518 | −0.30 E-3 | −0.228 E-05 | −0.476 E-07 | 0 |
| 14 | −1.799 | −0.30 E-3 | −0.445 E.05 | −0.286 E-07 | −0.200 E-08 |
| 15 | 0.977 | −0.30 E-3 | −0.309 E-05 | −0.400 E-07 | 0 |
| 16 | 4.922 | 0.30 E-3 | 0.176 E.05 | 0.39 E.07 | 0 |
| 17 | −7.96 | 0.30 E-3 | 0.12 E-5 | 0.218 E-7 | 0 |
| 18 | 98.434 | 0.30 E-3 | 0.73 E-6 | −0.224 E-7 | 0 |
| 19 | −30.32 | 0.30 E-3 | 0.567 E-6 | 0.195 E-7 | 0 |
| 20 | −6.708 | 0.30 E-3 | 0.13 E-5 | 0.277 E-7 | 0 |
| 21 | −0.001 | 0 | 0 | 0 | 0 |
|  |  | 0.18 E-3 | −0.9375 E-05 | 0.399 E-07 | 0 |
| 22 | 0.026 | 0 | 0 | 0 | 0 |
|  |  | 0.30 E-3 | 0.18 E-05 | 0.313 E-07 | 0 |
| 23 | −0.169 | 0 | 0 | 0 | 0 |
|  |  | 0.50 E-3 | 0.597 E-05 | 0.143 E-06 | 0 |

TABLE 2

| Example | R1 | R2 | R3 | R4 | l1 | l2 | l3 | s' | n1 | n3 | aspher surface R | K | AC4 | AC6 | AC8 | AC10 |
|---|---|---|---|---|---|---|---|---|---|---|---|---|---|---|---|---|
| 1 | 12.82 | −30.85 | 9.52 | −64.06 | 3.5 | 7.9 | 2.5 | 5.0 | 1.61 | 1.79 | 1 | 0 | −0.17 E-3 | −0.155 E-6 | −0.97 E-8 | 0 |
|  |  |  |  |  |  |  |  |  |  |  | 3 | 0 | −0.11 E-3 | 0.665 E-6 | 0 | 0 |
| 2 | 12.82 | −27.92 | 9.52 | −26.15 | 3.5 | 8.32 | 2.5 | 8.0 | 1.61 | 1.79 | 1 | 0 | −0.137 E-3 | −0.635 E-6 | −0.202 E-7 | 0 |
|  |  |  |  |  |  |  |  |  |  |  | 3 | 0 | −0.236 E-3 | −0.168 E-5 | 0 | 0 |
| 3 | 12.82 | −51.2 | 9.52 | −49.25 | 5.0 | 6.79 | 4.0 | 5.0 | 1.61 | 1.79 | 1 | 0 | −0.136 E-3 | −0.104 E-5 | −0.106 E-7 | 0 |
|  |  |  |  |  |  |  |  |  |  |  | 3 | 0 | −0.133 E-3 | −0.103 E-5 | 0 | 0 |
| 4 | 12.82 | −28.07 | 9.52 | −42.23 | 1.5 | 9.23 | 1.5 | 5.0 | 1.61 | 1.79 | 1 | 0 | −0.196 E-3 | −0.100 E-5 | −0.997 E-8 | 0 |
|  |  |  |  |  |  |  |  |  |  |  | 3 | 0 | −0.14 E-3 | −0.315 E-7 | 0 | 0 |
| 5 | 20.00 | −13.64 | 25.0 | −11.9 | 3.5 | 7.92 | 2.5 | 5.0 | 1.61 | 1.79 | 1 | 0 | −0.3 E-3 | −0.227 E-6 | −0.113 E-7 | 0 |
|  |  |  |  |  |  |  |  |  |  |  | 3 | 0 | −0.293 E-3 | −0.163 E-5 | 0 | 0 |
| 6 | 12.82 | −90.1 | 6.67 | −399.43 | 3.5 | 9.56 | 2.5 | 5.0 | 1.61 | 1.79 | 1 | 0 | −0.132 E-3 | 0.309 E-5 | −0.213 E-7 | 0 |
|  |  |  |  |  |  |  |  |  |  |  | 3 | 0 | −0.24 E-3 | −0.673 E-5 | 0 | 0 |
| 7 | 8.33 | 1008.7 | 9.52 | 38.34 | 3.5 | 6.17 | 2.5 | 5.0 | 1.61 | 1.79 | 1 | 0 | −0.18 E-3 | −0.10 E-5 | −0.305 E-7 | 0 |
|  |  |  |  |  |  |  |  |  |  |  | 3 | 0 | −0.27 E-3 | −0.23 E-5 | 0 | 0 |
| 8 | 50.0 | −12.83 | 9.52 | −18.45 | 3.5 | 10.33 | 2.5 | 5.0 | 1.61 | 1.79 | 1 | 0 | −0.237 E-3 | 0.65 E-7 | −0.20 E-7 | 0 |
|  |  |  |  |  |  |  |  |  |  |  | 3 | 0 | −0.115 E-3 | −0.603 E-6 | 0 | 0 |
| 9 | 12.5 | −98.95 | 9.52 | −52.28 | 3.5 | 7.57 | 2.5 | 3.5 | 1.61 | 1.79 | 1 | 0 | 0.994 E-5 | −0.432 E-6 | −0.877 E-8 | 0 |
|  |  |  |  |  |  |  |  |  |  |  | 3 | 0 | −0.27 E-3 | −0.50 E-6 | 0 | 0 |
| 10 | 20.0 | −13.96 | 9.52 | −20.26 | 3.5 | 9.24 | 2.5 | 4. | 1.61 | 1.89 | 1 | 0 | −0.186 E-3 | 0.116 E-6 | −0.113 E-7 | 0 |
|  |  |  |  |  |  |  |  |  |  |  | 3 | 0 | −0.101 E-3 | −0.433 E-5 | 0 | 0 |
| 11 | 12.82 | −270.55 | 9.52 | 493.87 | 3.5 | 7.7 | 2.5 | 5.0 | 1.79 | 1.89 | 1 | 0 | −0.113 E-3 | −0.112 E-5 | −0.725 E-8 | 0 |
|  |  |  |  |  |  |  |  |  |  |  | 3 | 0 | −0.28 E-3 | 0.587 E-6 | 0 | 0 |
| 12 | 12.82 | −16.01 | 9.52 | −13.04 | 3.5 | 7.39 | 2.5 | 5.0 | 1.51 | 1.51 | 1 | 0 | −0.325 E-3 | −0.529 E-6 | −0.124 E-7 | 0 |
|  |  |  |  |  |  |  |  |  |  |  | 3 | 0 | −0.17 E-3 | −0.287 E-5 | 0 | 0 |
| 13 | 12.82 | −30.85 | 9.52 | −64.05 | 3.5 | 7.9 | 2.5 | 5.0 | 1.61 | 1.79 | 1 | 0 | −0.113 E-3 | −0.155 E-6 | −0.972 E-8 | 0 |
|  |  |  |  |  |  |  |  |  |  |  | 3 | 0 | −0.223 E-3 | 0.666 E-6 | 0 | 0 |
| 14 | 12.82 | −20.67 | 9.52 | −43.78 | 3.5 | 8.32 | 2.5 | 4.0 | 1.61 | 1.89 | 1 | 0 | 0.175 E-3 | −0.778 E-6 | −0.832 E-8 | 0 |
|  |  |  |  |  |  |  |  |  |  |  | 3 | 0 | −0.114 E-3 | −0.793 E-5 | 0 | 0 |
| 15 | 8.33 | 15.44 | 7.69 | 27.97 | 3.5 | 5.94 | 2.5 | 6.0 | 1.61 | 1.79 | 1 | 0 | −0.13 E-3 | −0.499 E-6 | −0.245 E-7 | 0 |
|  |  |  |  |  |  |  |  |  |  |  | 4 | 0 | 0.46 E-3 | 0.14 E-5 | 0 | 0 |
| 16 | 50.00 | −15.77 | 9.52 | −25.22 | 3.5 | 10.1 | 2.5 | 6.0 | 1.61 | 1.79 | 1 | 0 | −0.219 E-3 | 0.247 E-6 | −0.112 E-7 | 0 |
|  |  |  |  |  |  |  |  |  |  |  | 4 | 0 | 0.25 E-3 | −0.15 E-5 | 0 | 0 |
| 17 | 25.00 | −42.63 | 9.52 | −49.87 | 3.5 | 9.43 | 2.5 | 6.0 | 1.61 | 1.79 | 1 | 0 | −0.112 E-3 | 0.184 E-6 | −0.80 E-8 | 0 |
|  |  |  |  |  |  |  |  |  |  |  | 4 | 0 | 0.19 E-3 | −0.14 E-5 | 0 | 0 |
| 18 | 20.00 | −13.59 | 11.11 | −10.72 | 3.5 | 7.44 | 2.5 | 6.0 | 1.51 | 1.51 | 1 | 0 | −0.339 E-3 | −0.119 E-6 | −0.14 E-7 | 0 |
|  |  |  |  |  |  |  |  |  |  |  | 4 | 0 | 0.434 E-3 | −0.319 E-5 | 0 | 0 |
| 19 | 12.82 | −199.77 | 9.52 | −54.97 | 3.5 | 7.33 | 2.5 | 4.0 | 1.61 | 1.79 | 1 | 0 | −0.114 E-3 | −0.441 E-6 | −0.937 E-8 | 0 |
|  |  |  |  |  |  |  |  |  |  |  | 4 | 0 | 0.773 E-5 | 0.695 E-6 | 0 | 0 |
| 20 | 20.00 | −22.32 | 11.11 | −26.51 | 3.5 | 8.26 | 2.5 | 6.0 | 1.61 | 1.79 | 1 | 0 | −0.19 E-3 | 0.178 E-6 | −0.12 E-7 | 0 |
|  |  |  |  |  |  |  |  |  |  |  | 4 | 0 | 0.179 E-3 | −0.178 E-5 | 0 | 0 |
| 21 | 9.09 | 14.15 | 12.5 | −21.4 | 3.5 | 4.0 | 2.5 | 8.78 | 1.61 | 1.79 | 1 | 0.12212 | −0.25 E-3 | −0.727 E-6 | −0.46 E-7 | 0 |
|  |  |  |  |  |  |  |  |  |  |  | 4 | 3.12615 | 0.26 E-3 | −0.2 E-5 | 0 | 0 |
| 22 | 10.00 | 76.69 | 9.09 | −68.03 | 3.5 | 7.16 | 2.5 | 6.00 | 1.61 | 1.79 | 2 | 0 | 0.264 E-3 | −0.377 E-6 | 0.122 E-7 | 0 |
|  |  |  |  |  |  |  |  |  |  |  | 4 | 0 | 0.217 E-3 | −0.559 E-6 | 0 | 0 |
| 23 | 8.33 | 430.61 | 7.14 | 27.95 | 3.5 | 7.65 | 2.5 | 4.00 | 1.61 | 1.79 | 2 | 0 | 0.349 E-3 | −0.874 E-4 | 0.17 E-7 | 0 |
|  |  |  |  |  |  |  |  |  |  |  | 4 | 0 | 0.270 E-3 | 0.554 E-6 | 0 | 0 |
| 24 | 10.00 | 23.03 | 9.09 | −54.17 | 3.5 | 6.34 | 2.5 | 5.0 | 1.61 | 1.79 | 2 | 0 | 0.234 E-3 | 0.59 E-6 | 0.34 E-7 | 0 |
|  |  |  |  |  |  |  |  |  |  |  | 4 | 0 | 0.77 E-4 | −0.24 E-6 | 0 | 0 |
| 25 | 10.32 | 145.69 | 9.09 | −60.43 | 3.5 | 7.4 | 2.5 | 5.82 | 1.61 | 1.79 | 1 | −0.00286 | 0 | 0 | 0 | 0 |
|  |  |  |  |  |  |  |  |  |  |  | 2 | 0 | 0.26 E-3 | −0.54 E-6 | 0.143 E-7 | 0 |

TABLE 2-continued

| Example | R1 | R2 | R3 | R4 | l1 | l2 | l3 | s' | n1 | n3 | aspher surface R | K | AC4 | AC6 | AC8 | AC10 |
|---|---|---|---|---|---|---|---|---|---|---|---|---|---|---|---|---|
| 26 | 9.43 | 23.52 | 9.09 | −35.01 | 5.0 | 5.62 | 4.0 | 6.0 | 1.61 | 1.79 | 4 | 0 | 0.2 E-3 | 0 | 0 | 0 |
|  |  |  |  |  |  |  |  |  |  |  | 2 | 0 | 0.379 E-3 | 0.929 E-6 | 0.419 E-7 | 0 |
| 27 | 9.43 | 367.44 | 9.09 | 542.83 | 1.5 | 8.08 | 1.5 | 6.0 | 1.61 | 1.79 | 4 | 0 | 0.286 E-3 | −0.182 E-5 | 0 | 0 |
|  |  |  |  |  |  |  |  |  |  |  | 2 | 0 | 0.214 E-3 | −0.807 E-6 | 0.678 E-8 | 0 |
| 28 | 9.43 | −414.55 | 7.14 | −19.9 | 3.5 | 6.77 | 2.5 | 6.0 | 1.51 | 1.51 | 4 | 0 | 0.215 E-3 | 0.152 E-5 | 0 | 0 |
|  |  |  |  |  |  |  |  |  |  |  | 2 | 0 | 0.33 E-3 | −0.667 E-6 | 0.105 E-7 | 0 |
| 29 | 12.5 | 68.56 | 6.67 | −194.68 | 3.5 | 10.05 | 2.5 | 6.0 | 1.61 | 1.79 | 4 | 0 | 0.54 E-3 | −0.306 E-5 | 0 | 0 |
|  |  |  |  |  |  |  |  |  |  |  | 2 | 0 | 0.182 E-3 | −0.122 E-5 | 0.185 E-7 | 0 |
| 30 | 8.33 | 31.4 | 9.09 | −284.31 | 3.5 | 6.27 | 2.5 | 6.0 | 1.61 | 1.79 | 4 | 0 | 0.519 E-3 | −0.445 E-5 | 0 | 0 |
|  |  |  |  |  |  |  |  |  |  |  | 2 | 0 | 0.349 E-3 | 0.687 E-7 | 0.224 E-7 | 0 |
| 31 | 50.00 | −17.32 | 9.09 | −21.92 | 3.5 | 10.88 | 2.5 | 6.0 | 1.61 | 1.79 | 4 | 0 | 0.246 E-3 | 0.323 E-5 | 0 | 0 |
|  |  |  |  |  |  |  |  |  |  |  | 2 | 0 | 0.204 E-3 | 0.113 E-6 | 0.561 E-8 | 0 |
| 32 | 10.00 | 76.69 | 9.09 | −68.03 | 3.5 | 7.16 | 2.5 | 6.0 | 1.61 | 1.79 | 4 | 0 | 0.335 E-3 | −0.197 E-5 | 0 | 0 |
|  |  |  |  |  |  |  |  |  |  |  | 2 | 0 | 0.264 E-3 | −0.377 E-6 | 0.122 E-7 | 0 |
| 33 | 20.00 | −43.51 | 20.0 | −14.05 | 3.5 | 6.66 | 2.5 | 8.0 | 1.61 | 1.79 | 4 | 0 | 0.217 E-3 | −0.56 E-6 | 0 | 0 |
|  |  |  |  |  |  |  |  |  |  |  | 2 | 0 | 0.295 E-3 | 0.680 E-6 | 0.288 E-7 | 0 |
| 34 | 8.7 | 28.09 | 9.09 | −177.9 | 3.5 | 6.07 | 2.5 | 4.0 | 1.61 | 1.79 | 4 | 0 | 0.141 E-3 | −0.339 E-6 | 0 | 0 |
|  |  |  |  |  |  |  |  |  |  |  | 2 | 0 | 0.264 E-3 | −0.24 E-6 | 0.388 E-7 | −0.2 E-9 |
| 35 | 9.43 | −55.23 | 9.09 | −90.43 | 3.5 | 7.78 | 2.5 | 4.0 | 1.61 | 1.79 | 4 | 0 | −0.293 E-4 | −0.442 E-6 | 0 | 0 |
|  |  |  |  |  |  |  |  |  |  |  | 2 | 0 | 0.322 E-3 | −0.177 E-5 | 0.25 E-7 | 0 |
| 36 | 14.29 | 82.09 | 10.0 | −28.32 | 1.5 | 9.63 | 1.5 | 8.0 | 1.61 | 1.79 | 4 | 0 | −0.910 E-4 | −0.153 E-7 | 0 | 0 |
|  |  |  |  |  |  |  |  |  |  |  | 3 | 0 | 0.170 E-3 | 0.423 E-6 | 0.161 E-7 | −0.1 E-9 |
| 37 | 11.11 | −141.85 | 9.09 | −71.37 | 1.5 | 8.87 | 1.5 | 6.0 | 1.61 | 1.79 | 4 | 0 | −0.192 E-3 | −0.149 E-5 | 0 | 0 |
|  |  |  |  |  |  |  |  |  |  |  | 3 | 0 | 0.19 E-3 | −0.635 E-6 | 0.1 E-7 | 0 |
| 38 | 8.33 | 89.51 | 16.67 | −26.6 | 3.5 | 5.48 | 2.5 | 6.0 | 1.61 | 1.79 | 2 | 0 | −0.148 E-3 | −0.341 E-5 | 0 | 0 |
|  |  |  |  |  |  |  |  |  |  |  | 3 | 0 | 0.348 E-3 | −0.111 E-5 | 0.328 E-7 | −0.3 E-9 |
| 39 | 20.00 | −34.29 | 9.09 | −23.23 | 3.5 | 9.87 | 2.5 | 6.0 | 1.61 | 1.79 | 2 | 0 | −0.17 E-3 | −0.635 E-5 | 0 | 0 |
|  |  |  |  |  |  |  |  |  |  |  | 3 | 0 | 0.178 E-3 | 0.134 E-6 | 0.209 E-7 | 0 |
| 40 | 9.43 | 25.15 | 11.11 | −82.02 | 3.5 | 6.21 | 2.5 | 6.0 | 1.79 | 1.89 | 2 | 0 | −0.221 E-3 | −0.397 E-5 | 0 | 0 |
|  |  |  |  |  |  |  |  |  |  |  | 3 | 0 | 0.236 E-3 | −0.452 E-8 | 0.178 E-7 | 0 |
| 41 | 9.43 | −33.61 | 9.09 | −12.56 | 3.5 | 7.06 | 2.5 | 5.0 | 1.51 | 1.51 | 2 | 0 | −0.14 E-3 | −0.238 E-5 | 0 | 0 |
|  |  |  |  |  |  |  |  |  |  |  | 3 | 0 | 0.387 E-3 | −0.15 E-5 | 0.27 E-7 | 0 |
| 42 | 9.43 | 46.17 | 9.09 | −55.72 | 3.5 | 7.15 | 2.5 | 6.0 | 1.61 | 1.79 | 2 | 0 | −0.349 E-3 | −0.185 E-4 | 0 | 0 |
|  |  |  |  |  |  |  |  |  |  |  | 3 | 0 | 0.276 E-3 | −0.123 E-6 | 0.223 E-7 | 0 |
|  |  |  |  |  |  |  |  |  |  |  | 3 | 0 | −0.161 E-3 | −0.342 E-5 | 0 | 0 |

TABLE 3

| Example | 1 | 2 | 3 | 4 | 5 | 6 |
|---|---|---|---|---|---|---|
| R1 | 22.19 | 20.00 | 19.23 | 20.00 | 33.33 | 20.83 |
| R2 | −16.39 | −27.10 | −20.61 | −18.09 | −11.61 | −16.82 |
| R3 | 16.67 | 16.67 | 16.67 | 12.5 | 100.00 | 16.67 |
| R4 | −22.0 | −18.57 | −17.17 | −61.03 | −13.15 | −17.07 |
| R5 | 12.5 | 12.5 | 8.33 | 12.5 | 12.5 | 12.5 |
| R6 | −88.05 | 45.56 | 21.47 | −39.96 | −39.96 | 61.08 |
| l1 | 3.5 | 3.5 | 3.5 | 3.5 | 3.5 | 3.5 |
| l2 | 7.4 | 6.14 | 7.72 | 7.38 | 7.3 | 7.27 |
| l3 | 2.5 | 2.5 | 2.5 | 2.5 | 2.5 | 2.5 |
| l4 | 0.2 | 0.2 | 0.2 | 0.2 | 0.2 | 0.2 |
| l5 | 2.0 | 2.0 | 2.0 | 2.0 | 2.0 | 2.0 |
| s' | 4.57 | 6.0 | 4.5 | 4.5 | 4.5 | 4.5 |
| n1 | 1.61 | 1.61 | 1.61 | 1.61 | 1.61 | 1.61 |
| n3 | 1.51 | 1.51 | 1.51 | 1.51 | 1.51 | 1.51 |
| n5 | 1.51 | 1.51 | 1.51 | 1.51 | 1.51 | 1.51 |
| aspher. surface R | 1 | 1 | 1 | 1 | 1 | 1 |
| K | −20.318 | −20.0 | −20.0 | −20.0 | −20.0 | −20.0 |
| AC4 | 0 | 0.116 E-3 | 0.15 E-3 | 0.11 E-3 | −0.284 E-3 | 0.461 E-3 |
| AC6 | −0.359 E-5 | −0.545 E-5 | −0.679 E-5 | −0.61 E-5 | −0.706 E-6 | −0.511 E-5 |
| AC8 | 0.33 E-7 | 0.485 E-7 | 0.769 E-7 | 0.76 E-7 | −0.397 E-8 | 0.569 E-7 |
| AC10 | 0 | 0 | 0 | 0 | 0 | 0 |

| Example | 7 | 8 | 9 | 10 | 11 | 12 |
|---|---|---|---|---|---|---|
| R1 | 28.46 | 20.46 | 28.46 | 16.13 | 16.67 | 20.00 |
| R2 | −16.98 | −14.17 | −35.61 | 195.38 | −35.03 | −13.77 |
| R3 | 16.67 | 16.67 | 16.67 | 16.67 | 16.67 | 16.67 |
| R4 | −19.72 | −23.48 | −46.27 | −15.05 | −21.4 | −406.33 |
| R5 | 12.5 | 12.5 | 12.5 | 12.5 | 12.50 | 10.0 |
| R6 | 327.48 | −39.96 | 38.95 | 41.36 | −62.16 | −18.38 |
| l1 | 5.0 | 3.5 | 3.5 | 3.5 | 3.5 | 3.5 |
| l2 | 5.93 | 7.76 | 8.8 | 4.79 | 6.91 | 7.44 |
| l3 | 4.0 | 2.5 | 2.5 | 2.5 | 2.5 | 2.5 |
| l4 | 0.2 | 0.2 | 0.2 | 0.2 | 0.2 | 0.2 |
| l5 | 3.0 | 2.0 | 2.0 | 2.0 | 2.0 | 2.0 |
| s' | 4.5 | 4.5 | 4.5 | 5.0 | 3.0 | 3.7 |
| n1 | 1.61 | 1.61 | 1.79 | 1.61 | 1.61 | 1.61 |
| n3 | 1.51 | 1.51 | 1.79 | 1.51 | 1.51 | 1.51 |
| n5 | 1.51 | 1.51 | 1.79 | 1.51 | 1.51 | 1.51 |
| aspher. surface R | 1 | 1 | 1 | 1 | 1 | 1 |
| K | −20.0 | −20.0 | −20.0 | 0 | 0 | −20.0 |
| AC4 | −0.101 E-3 | −0.149 E-3 | −0.218 E-3 | −0.169 E-3 | −0.135 E-3 | 0.428 E-3 |
| AC6 | −0.119 E-5 | −0.107 E-5 | −0.108 E-5 | −0.11 E-5 | −0.418 E-6 | −0.619 E-5 |
| AC8 | 0.249 E-9 | 0.669 E-9 | 0.314 E-8 | −0.215 E-7 | −0.685 E-8 | 0.8 E-7 |
| AC10 | 0 | 0 | 0 | 0 | 0 | 0 |

E-3 means $10^{-3}$

While I have shown and described only a few embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A scanning objective characterized by two lens means with positive power of refraction, of which the first lens means, as viewed in the direction of incidence of the beam includes an aspherical surface which is so constructed that in comparison with a spherical surface with the same vertex radius of curvature, the thickness of the lens means increases toward the outside and wherein the following values of curvatures $\phi_1$, $\phi_2$, $\phi_3$, and $\phi_4$ of the lens surface and of the air spacing ($l_2$) of the two lens means as function of the intercept length s' with a focal distance f normalized to 1

| s' | 0.2 | 0.3 | 0.4 | 0.5 | 0.6 | 0.7 | 0.8 | 0.9 |
|---|---|---|---|---|---|---|---|---|
| $\phi_1$ | 0.85 | 0.8 | 0.75 | 0.7 | 0.65 | 0.6 | 0.55 | 0.47 |
| $\phi_2$ | −0.25 | −.012 | −0.06 | −0.04 | −0.05 | −0.04 | 0.04 | 0.35 |
| $\phi_3$ | 1.15 | 1.1 | 1.0 | 0.8 | 0.6 | 0.35 | 0.27 | 0.25 |
| $\phi_4$ | −0.3 | −0.2 | −0.22 | −0.33 | −0.5 | −0.68 | −0.85 | −1.04 |
| $\phi_2$ | 0.86 | 0.8 | 0.69 | 0.57 | 0.47 | 0.36 | 0.24 | 0.14 | whereby the tolerances of the curvatures and of the air spacing amount each to about ±0.25 ($l_2$>0) and by the following values of the thickness $l_1$ of the first lens means:

$l_1$=0.35 with tolerances of +0.3 and 0.2
of the thickness $l_3$ of the second lens means:
$l_2$=0.25 with tolerances of +0.3 and −0.2,
and of the indices of refraction n1, n3=1, 7±0.2.

2. A scanning objective according to claim 1, characterized in that an outer diameter of the first lens is reduced by about one-half, the deviation of the aspherical surface from a spherical surface with the same vertex radius of curvature ($\Delta$ surface distance measured in the direction of the optical axis) is reduced by more than a factor of 4, and in that this factor decreases from the outside toward the inside.

3. A scanning objective according to claim 2, characterized in that the factor by which the deviation of the aspherical surface from a spherical surface with the same vertex radius of curvature is reduced lies for a space between an edge and half-diameter of the first lens between about 8 and 80 and for a space between a half and quarter diameter of the first lens between 5 and 50.

4. A scanning objective according to claim 3, characterized by the following values for the relative deviation $\Delta z$ of the aspherical surface from a spherical surface with the same vertex radius of curvature:

| h | 0.1 | 0.2 | 0.3 | 0.4 | 0.5 | 0.6 |
|---|---|---|---|---|---|---|
| $\Delta z$ | 0.005 | 0.03 | 0.11 | 0.4 | 1.0 | 2.2 | whereby the focal distance f as well as the relative deviation $\Delta z$ ($\Delta$ surface distance measured in the direction of the optical axis) is normalized to 1 with a distance h from the optical axis of 0.5.

5. A scanning objective according to claim 4, characterized in that the first surface of the first lens means is the aspherical surface.

6. A scanning objective according to claim 5, characterized in that the first lens means has a second aspherical surface, of which at least one of said first and second aspherical surfaces of said first lens is so constructed that in comparison with a spherical surface having the same vertex radius of curvature, the thickness of the lens means increases toward the outside.

7. A scanning objective according to claim 6, characterized in that the objective has the data of one of the four following embodiments:

| R1 | R2 | R3 | R4 | l1 | l2 | l3 | s' | n1 | n3 |
|---|---|---|---|---|---|---|---|---|---|
| 11.97 | 1048.1 | 9.52 | −46.56 | 3.5 | 7.4 | 2.5 | 3.9 | 1.61 | 1.79 |
| 9.64 | 29.41 | 12.5 | −28.51 | 3.5 | 5. | 2.5 | 5.19 | 1.61 | 1.79 |
| 7.07 | 12.12 | 15.87 | −22.22 | 3.5 | 2.8 | 2.5 | 5.77 | 1.61 | 1.79 |
| 10.32 | 145.09 | 9.09 | −60.43 | 3.5 | 7.4 | 2.5 | 5.82 | 1.61 | 1.79 |

| aspheric surface R | K | AC4 | AC6 | AC8 | AC10 |
|---|---|---|---|---|---|
| 1 | −0.001 | 0 | 0 | 0 | 0 |
| 2 | 0 | 0.18 E-3 | −0.9375 E-05 | 0.399 E-07 | 0 |
| 1 | 0.026 | 0 | 0 | 0 | 0 |
| 2 | 0 | 0.30 E-3 | 0.1800 E-05 | 0.313 E-07 | 0 |
| 1 | −0.169 | 0 | 0 | 0 | 0 |
| 2 | 0 | 0.50 E-3 | 0.5970 E-05 | 0.143 E-06 | 0 |
| 1 | −0.00286 | 0 | 0 | 0 | 0 |
| 2 | 0 | 0.26 E-3 | 0.5400 E-06 | 0.143 E-07 | 0 |
| 4 | 0 | 0.2 E-3 | 0 | 0 | 0 | wherein R equals the radius of curvature of the lens surface with the numerals thereafter denoting which surface in said direction of incidence; l indicating the spacing between lens surfaces along a center line in said direction of incidences with the numeral 1 being the distance between the first and second lens surface, numeral 2 between the second and third lens surfaces, and numeral 3 between the third and fourth lens surface; s' being the intercept length; n is the index of refraction of the lens material with the numeral 1 designating the lens material between lens surfaces 1 and 2, and numeral 3 designating the lens material between lens surfaces 3 and 4; and wherein K, AC4, AC6, AC8 and AC10 are aspherical coefficients used to determine a meniscus height of an aspherical surface represented by the follwing equation wherein $$\text{meniscus height} = \phi h^2/(1 + \sqrt{1 - (k+1)g^2h^2}) + AC4'h^4 + AC6'h^6 + AC8'h^8 + AC10'h^{10}$$

and wherein h is a distance of a surface point from an optical axis and $\phi$ is a surface vertex.

8. A scanning objective characterized by two lens means with positive power of refraction, of which the first lens means, as viewed in the direction of incidence of the beam includes an aspherical surface which is so constructed that in comparison with a spherical surface with the same vertex radius of curvature, the thickness of the lens means increases toward the outside and wherein an outer diameter of the first lens is reduced by about one-half, the deviation of the aspherical surface from a spherical surface with the same vertex radius of curvature (surface distance measured in the direction of the optical axis) is reduced by more than a factor of 4, and in that this factor decreases from the outside toward the inside.

9. A scanning objective according to claim 8, characterized in that the factor by which the deviation of the aspherical surface from a spherical surface with the same vertex radius of curvature is reduced lies for a space between an edge and half-diameter of the first lens between about 8 and 80 and for a space between half and quarter diameter of the first lens between 5 and 50.

10. A scanning objective according to claim 9, characterized by the following values for the relative deviation $\Delta z$ of the aspherical surface from a spherical surface with the same vertex radius of curvature:

| h | 0.1 | 0.2 | 0.3 | 0.4 | 0.5 | 0.6 |
|---|---|---|---|---|---|---|
| $\Delta z$ | 0.005 | 0.03 | 0.11 | 0.4 | 1.0 | 2.2 | whereby the focal distance f as well as the relative deviation $\Delta z$ ($\Delta$ surface distance measured in the direction of the optical axis) is normalized to 1 with a distance h from the optical axis of 0.5.

11. A scanning objective characterized by two lens means with positive power of refraction, of which the first lens means, as viewed in the direction of incidence of the beam includes an aspherical surface which is so constructed that in comparison with a spherical surface with the same vertex radius of curvature, the thickness of the lens means increases toward the outside and wherein the first surface of the first lens means is the aspherical surface and wherein the first lens means has a second aspherical surface, of which at least one of said first and second aspherical surface of said first lens is so constructed that in comparison with a spherical surface having the same vertex of curvature, the thickness of the lens means increases toward the outside.

12. A scanning objective characterized by two lens means with positive power of refraction, of which the first lens means, as viewed in the direction of incidence of the beam includes an aspherical surface which is to constructed that in comparison with a spherical surface with the same vertex radius of curvature, the thickness of the lens means increases toward the outside and wherein the objective has the data of one of the embodiments according to the following Tables 1-3,

TABLE 1 aspher surface

TABLE 1-continued

| Example | R1 | R2 | R3 | R4 | l1 | l2 | l3 | s' | n1 | n3 | R |
|---|---|---|---|---|---|---|---|---|---|---|---|
| 1 | 12.82 | −335.05 | 9.52 | −206.94 | 3.5 | 7.28 | 4.0 | 4.0 | 1.51 | 1.89 | 1 |
| 2 | 12.82 | −61.57 | 9.52 | −50.66 | 3.5 | 7.94 | 1.0 | 4.0 | 1.61 | 1.79 | 1 |
| 3 | 12.2 | −419.27 | 9.52 | −55.87 | 1.5 | 8.25 | 2.5 | 4.0 | 1.61 | 1.78 | 1 |
| 4 | 11.49 | −42.56 | 9.52 | −24.30 | 3.5 | 6.48 | 2.5 | 4.0 | 1.51 | 1.61 | 1 |
| 5 | 14.29 | 410.64 | 11.76 | −46.65 | 3.5 | 7.04 | 2.5 | 4.0 | 1.78 | 1.89 | 1 |
| 6 | 13.89 | −65.76 | 11.76 | −41.99 | 3.5 | 7.4 | 2.5 | 4.0 | 1.61 | 1.89 | 1 |
| 7 | 11.76 | 51.12 | 6.9 | 29.92 | 3.5 | 8.31 | 2.5 | 4.0 | 1.61 | 1.89 | 1 |
| 8 | 12.82 | −178.88 | 9.52 | −58.61 | 3.5 | 7.27 | 2.5 | 4.0 | 1.61 | 1.79 | 1 |
| 9 | 17.09 | −51.18 | 66.67 | −12.51 | 3.5 | 3.14 | 2.5 | 7.0 | 1.61 | 1.79 | 1 |
| 10 | 14.93 | 61.09 | 16.67 | −18.49 | 3.5 | 3.57 | 2.5 | 7.0 | 1.61 | 1.79 | 1 |
| 11 | 17.24 | −99.39 | 28.57 | −17.24 | 3.5 | 4.66 | 1.0 | 7.0 | 1.61 | 1.89 | 1 |
| 12 | 17.24 | −272.17 | 28.57 | −16.35 | 1.5 | 4.99 | 2.5 | 7.0 | 1.61 | 1.89 | 1 |
| 13 | 16.67 | −63.99 | 28.57 | −16.72 | 3.5 | 3.85 | 2.5 | 7.0 | 1.51 | 1.89 | 1 |
| 14 | 13.51 | −57.53 | 28.57 | −11.13 | 3.5 | 2.49 | 2.5 | 7.0 | 1.51 | 1.60 | 1 |
| 15 | 16.67 | −165.71 | 28.57 | −14.44 | 3.5 | 3.41 | 2.5 | 7.0 | 1.61 | 1.79 | 1 |
| 16 | 8.33 | 22.65 | 12.5 | −39.13 | 3.5 | 4.32 | 2.5 | 5 | 1.61 | 1.79 | 2 |
| 17 | 9.70 | 26.73 | 10.0 | −54.65 | 3.5 | 5.49 | 2.5 | 5 | 1.61 | 1.79 | 2 |
| 18 | 9.71 | 53.47 | 12.5 | −24.42 | 4.5 | 5.08 | 2.5 | 5.0 | 1.51 | 1.79 | 2 |
| 19 | 9.71 | 49.64 | 12.5 | −49.7 | 3.5 | 6.10 | 1.0 | 5.0 | 1.61 | 1.89 | 2 |
| 20 | 9.71 | 34.59 | 12.5 | −29.75 | 3.5 | 5.15 | 2.5 | 5.0 | 1.61 | 1.79 | 2 |
| 21 | 11.97 | 1048.1 | 9.52 | −46.56 | 3.5 | 7.4 | 2.5 | 3.9 | 1.61 | 1.79 | 1 2 |
| 22 | 9.64 | 29.41 | 12.5 | −28.51 | 3.5 | 5. | 2.5 | 5.19 | 1.61 | 1.79 | 1 2 |
| 23 | 7.07 | 12.12 | 15.87 | −22.22 | 3.5 | 2.8 | 2.5 | 5.77 | 1.61 | 1.79 | 1 2 |

| Example | K | AC4 | AC6 | AC8 | AC10 |
|---|---|---|---|---|---|
| 1 | −1.817 | 0 | −0.7964 E-06 | 0 | 0 |
| 2 | −2.104 | 0 | −0.926 E-06 | 0 | 0 |
| 3 | −1.594 | 0 | −0.742 E-06 | 0 | 0 |
| 4 | −2.033 | 0 | −0.137 E-05 | 0 | 0 |
| 5 | −1.912 | 0 | −0.620 E-06 | 0 | 0 |
| 6 | −2.550 | 0 | −0.997 E-06 | 0 | 0 |
| 7 | −0.937 | 0 | −0.338 E-06 | 0 | 0 |
| 8 | −1.796 | 0 | −0.766 E-06 | 0 | 0 |
| 9 | −0.911 | −0.3 E-3 | −0.269 E-05 | −0.709 E-07 | 0 |
| 10 | 1.801 | −0.30 E-3 | −0.247 E-05 | −0.464 E-07 | 0 |
| 11 | 1.688 | −0.30 E-3 | −0.2155 E-05 | −0.417 E-07 | 0 |
| 12 | 1.505 | −0.30 E-3 | −0.2256 E-05 | −0.456 E-07 | 0 |
| 13 | 0.518 | −0.30 E-3 | −0.228 E-05 | −0.476 E-07 | 0 |
| 14 | −1.799 | −0.30 E-3 | −0.445 E-05 | −0.286 E-07 | −0.200 E-08 |
| 15 | 0.977 | −0.30 E-3 | −0.309 E-05 | −0.400 E-07 | 0 |
| 16 | 4.922 | 0.30 E-3 | 0.176 E.05 | 0.39 E.07 | 0 |
| 17 | −7.96 | 0.30 E-3 | 0.12 E-5 | 0.218 E-7 | 0 |
| 18 | 98.434 | 0.30 E-3 | 0.73 E-6 | −0.224 E-7 | 0 |
| 19 | −30.32 | 0.30 E-3 | 0.567 E-6 | 0.195 E-7 | 0 |
| 20 | −6.708 | 0.30 E-3 | 0.13 E-5 | 0.277 E-7 | 0 |
| 21 | −0.001 | 0 | 0 | 0 | 0 |
|  |  | 0.18 E-3 | −0.9375 E-05 | 0.399 E-07 | 0 |
| 22 | 0.026 | 0 | 0 | 0 | 0 |
|  |  | 0.30 E-3 | 0.18 E-05 | 0.313 E-07 | 0 |
| 23 | −0.169 | 0 | 0 | 0 | 0 |
|  |  | 0.50 E-3 | 0.597 E-05 | 0.143 E-06 | 0 |

TABLE 2

| Example | R1 | R2 | R3 | R4 | l1 | l2 | l3 | s' | n1 | n3 | aspher surface R | K | AC4 | AC6 | AC8 | AC10 |
|---|---|---|---|---|---|---|---|---|---|---|---|---|---|---|---|---|
| 1 | 12.82 | −30.85 | 9.52 | −64.06 | 3.5 | 7.9 | 2.5 | 5.0 | 1.61 | 1.79 | 1 | 0 | −0.17 E-3 | −0.155 E-6 | −0.97 E-8 | 0 |
|  |  |  |  |  |  |  |  |  |  |  | 3 | 0 | −0.11 E-3 | 0.665 E-6 | 0 | 0 |
| 2 | 12.82 | −27.92 | 9.52 | −26.15 | 3.5 | 8.32 | 2.5 | 8.0 | 1.61 | 1.79 | 1 | 0 | −0.137 E-3 | −0.635 E-5 | −0.202 E-7 | 0 |
|  |  |  |  |  |  |  |  |  |  |  | 3 | 0 | −0.236 E-3 | −0.168 E-6 | 0 | 0 |
| 3 | 12.82 | −51.2 | 9.52 | −49.25 | 5.0 | 6.79 | 4.0 | 5.0 | 1.61 | 1.79 | 1 | 0 | −0.136 E-3 | −0.104 E-5 | −0.106 E-7 | 0 |
|  |  |  |  |  |  |  |  |  |  |  | 3 | 0 | −0.133 E-3 | −0.103 E-5 | 0 | 0 |
| 4 | 12.82 | −28.07 | 9.52 | −42.23 | 1.5 | 9.23 | 1.5 | 5.0 | 1.61 | 1.79 | 1 | 0 | −0.133 E-3 | −0.100 E-6 | −0.997 E-8 | 0 |
|  |  |  |  |  |  |  |  |  |  |  | 3 | 0 | −0.196 E-3 | −0.315 E-7 | 0 | 0 |
| 5 | 20.00 | −13.64 | 25.0 | −11.9 | 3.5 | 7.92 | 2.5 | 5.0 | 1.61 | 1.79 | 1 | 0 | −0.14 E-3 | −0.227 E-6 | −0.113 E-7 | 0 |
|  |  |  |  |  |  |  |  |  |  |  | 3 | 0 | −0.3 E-3 | −0.163 E-5 | 0 | 0 |
| 6 | 12.82 | −90.1 | 6.67 | −399.43 | 3.5 | 9.56 | 2.5 | 5.0 | 1.61 | 1.79 | 1 | 0 | −0.293 E-3 | 0.309 E-6 | −0.213 E-7 | 0 |
|  |  |  |  |  |  |  |  |  |  |  | 3 | 0 | −0.132 E-3 | −0.673 E-5 | 0 | 0 |
| 7 | 8.33 | 1008.7 | 9.52 | 38.34 | 3.5 | 6.17 | 2.5 | 5.0 | 1.61 | 1.79 | 1 | 0 | −0.24 E-3 | −0.10 E-5 | −0.305 E-7 | 0 |
|  |  |  |  |  |  |  |  |  |  |  | 3 | 0 | −0.18 E-3 | −0.23 E-5 | 0 | 0 |
| 8 | 50.0 | −12.83 | 9.52 | −18.45 | 3.5 | 10.33 | 2.5 | 5.0 | 1.61 | 1.89 | 1 | 0 | −0.27 E-3 | 0.65 E-7 | −0.20 E-7 | 0 |
|  |  |  |  |  |  |  |  |  |  |  | 3 | 0 | −0.237 E-3 | −0.603 E-5 | 0 | 0 |
| 9 | 12.5 | −98.95 | 9.52 | −52.28 | 3.5 | 7.57 | 2.5 | 3.5 | 1.61 | 1.79 | 1 | 0 | −0.115 E-3 | −0.432 E-6 | −0.877 E-8 | 0 |
|  |  |  |  |  |  |  |  |  |  |  | 3 | 0 | 0.974 E-5 | −0.50 E-5 | 0 | 0 |
| 10 | 20.0 | −13.96 | 9.52 | −20.26 | 3.5 | 9.24 | 2.5 | 4. | 1.61 | 1.79 | 1 | 0 | −0.27 E-3 | 0.116 E-6 | −0.113 E-7 | 0 |
|  |  |  |  |  |  |  |  |  |  |  | 3 | 0 | −0.186 E-3 | −0.433 E-5 | 0 | 0 |
| 11 | 12.82 | −270.55 | 9.52 | 493.87 | 3.5 | 7.7 | 2.5 | 5.0 | 1.79 | 1.89 | 1 | 0 | −0.101 E-3 | −0.112 E-6 | −0.725 E-8 | 0 |
|  |  |  |  |  |  |  |  |  |  |  | 3 | 0 | −0.113 E-3 | 0.587 E-5 | 0 | 0 |
| 12 | 12.82 | −16.01 | 9.52 | −13.04 | 3.5 | 7.39 | 2.5 | 5.0 | 1.51 | 1.51 | 1 | 0 | −0.28 E-3 | −0.529 E-6 | −0.124 E-7 | 0 |
|  |  |  |  |  |  |  |  |  |  |  | 3 | 0 | −0.325 E-3 | −0.287 E-5 | 0 | 0 |
| 13 | 12.82 | −30.85 | 9.52 | −64.05 | 3.5 | 7.9 | 2.5 | 5.0 | 1.61 | 1.79 | 1 | 0 | −0.17 E-3 | −0.155 E-6 | −0.972 E-8 | 0 |
|  |  |  |  |  |  |  |  |  |  |  | 3 | 0 | −0.113 E-3 | 0.666 E-6 | 0 | 0 |
| 14 | 12.82 | −20.67 | 9.52 | −43.78 | 3.5 | 8.32 | 2.5 | 4.0 | 1.61 | 1.79 | 1 | 0 | −0.223 E-3 | −0.778 E-6 | −0.832 E-8 | 0 |
|  |  |  |  |  |  |  |  |  |  |  | 3 | 0 | 0.175 E-3 | −0.793 E-5 | 0 | 0 |
| 15 | 8.33 | 15.44 | 7.69 | 27.97 | 3.5 | 5.94 | 2.5 | 6.0 | 1.79 | 1.89 | 1 | 0 | −0.13 E-3 | −0.499 E-6 | −0.245 E-7 | 0 |
|  |  |  |  |  |  |  |  |  |  |  | 4 | 0 | 0.46 E-3 | 0.14 E-5 | 0 | 0 |
| 16 | 50.00 | −15.77 | 9.52 | −25.22 | 3.5 | 10.1 | 2.5 | 6.0 | 1.61 | 1.79 | 1 | 0 | −0.219 E-3 | 0.247 E-6 | −0.112 E-7 | 0 |
|  |  |  |  |  |  |  |  |  |  |  | 4 | 0 | 0.25 E-3 | −0.15 E-5 | 0 | 0 |
| 17 | 25.00 | −42.63 | 9.52 | −49.87 | 3.5 | 9.43 | 2.5 | 6.0 | 1.79 | 1.89 | 1 | 0 | −0.112 E-3 | 0.184 E-6 | −0.80 E-8 | 0 |
|  |  |  |  |  |  |  |  |  |  |  | 4 | 0 | 0.19 E-3 | −0.14 E-5 | 0 | 0 |
| 18 | 20.00 | −13.59 | 9.52 | −10.72 | 3.5 | 7.44 | 2.5 | 6.00 | 1.51 | 1.51 | 1 | 0 | −0.339 E-3 | −0.119 E-6 | −0.14 E-7 | 0 |
|  |  |  |  |  |  |  |  |  |  |  | 4 | 0 | 0.434 E-3 | −0.319 E-5 | 0 | 0 |
| 19 | 12.82 | −199.77 | 9.52 | −64.05 | 3.5 | 7.33 | 2.5 | 4.00 | 1.61 | 1.79 | 1 | 0 | −0.114 E-3 | −0.441 E-6 | −0.937 E-8 | 0 |
|  |  |  |  |  |  |  |  |  |  |  | 4 | 0 | 0.773 E-5 | 0.695 E-5 | 0 | 0 |
| 20 | 20.00 | −22.32 | 11.11 | −26.51 | 3.5 | 8.26 | 2.5 | 4.0 | 1.61 | 1.79 | 1 | 0 | −0.19 E-3 | 0.178 E-6 | −0.12 E-7 | 0 |
|  |  |  |  |  |  |  |  |  |  |  | 4 | 0 | 0.179 E-3 | −0.178 E-5 | 0 | 0 |
| 21 | 9.09 | 14.15 | 12.5 | −21.4 | 3.5 | 4.0 | 2.5 | 8.78 | 1.61 | 1.79 | 1 | 0.12212 | −0.25 E-3 | −0.727 E-6 | −0.46 E-7 | 0 |
|  |  |  |  |  |  |  |  |  |  |  | 4 | 3.12615 | 0.26 E-3 | −0.2 E-5 | 0 | 0 |
| 22 | 10.00 | 76.69 | 9.09 | −68.03 | 3.5 | 7.16 | 2.5 | 6.00 | 1.61 | 1.79 | 2 | 0 | 0.264 E-3 | −0.377 E-6 | 0.122 E-7 | 0 |
|  |  |  |  |  |  |  |  |  |  |  | 4 | 0 | 0.217 E-3 | −0.559 E-6 | 0 | 0 |
| 23 | 8.33 | 430.61 | 7.14 | 27.95 | 3.5 | 7.65 | 2.5 | 4.00 | 1.61 | 1.79 | 2 | 0 | 0.349 E-3 | −0.874 E-4 | 0.17 E-7 | 0 |
|  |  |  |  |  |  |  |  |  |  |  | 4 | 0 | 0.270 E-3 | 0.554 E-4 | 0 | 0 |
| 24 | 10.00 | 23.03 | 9.09 | −54.17 | 3.5 | 6.34 | 2.5 | 5.0 | 1.61 | 1.79 | 2 | 0 | 0.234 E-3 | 0.59 E-6 | 0.34 E-7 | 0 |
|  |  |  |  |  |  |  |  |  |  |  | 4 | −0.00286 | 0.77 E-4 | −0.24 E-6 | 0 | 0 |
| 25 | 10.32 | 145.69 | 9.09 | −60.43 | 3.5 | 7.4 | 2.5 | 5.82 | 1.61 | 1.79 | 1 | 0 | 0 | 0 | 0 | 0 |
|  |  |  |  |  |  |  |  |  |  |  | 2 | 0 | 0.26 E-3 | −0.54 E-6 | 0.143 E-7 | 0 |

TABLE 2-continued

| Example | R1 | R2 | R3 | R4 | l1 | l2 | l3 | s' | n1 | n3 | aspher surface R | K | AC4 | AC6 | AC8 | AC10 |
|---|---|---|---|---|---|---|---|---|---|---|---|---|---|---|---|---|
| 26 | 9.43 | 23.52 | 9.09 | −35.01 | 5.0 | 5.62 | 4.0 | 6.0 | 1.61 | 1.79 | 4 | 0 | 0.2 E-3 | 0 | 0 | 0 |
|  |  |  |  |  |  |  |  |  |  |  |  |  | 0.379 E-3 | 0.929 E-6 | 0.419 E-7 | 0 |
| 27 | 9.43 | 367.44 | 9.09 | 542.83 | 1.5 | 8.08 | 1.5 | 6.0 | 1.61 | 1.79 | 2 | 0 | 0.286 E-3 | −0.182 E-5 | 0 | 0 |
|  |  |  |  |  |  |  |  |  |  |  |  |  | 0.214 E-3 | −0.807 E-6 | 0.678 E-8 | 0 |
| 28 | 9.43 | −414.55 | 7.14 | −19.9 | 3.5 | 6.77 | 2.5 | 6.0 | 1.51 | 1.51 | 4 | 0 | 0.215 E-3 | 0.152 E-5 | 0 | 0 |
|  |  |  |  |  |  |  |  |  |  |  |  |  | 0.33 E-3 | −0.667 E-6 | 0.105 E-7 | 0 |
| 29 | 12.5 | 68.56 | 6.67 | −194.68 | 3.5 | 10.05 | 2.5 | 6.0 | 1.61 | 1.79 | 2 | 0 | 0.54 E-3 | −0.306 E-5 | 0 | 0 |
|  |  |  |  |  |  |  |  |  |  |  |  |  | 0.182 E-3 | −0.122 E-5 | 0.185 E-7 | 0 |
| 30 | 8.33 | 31.4 | 9.09 | −284.31 | 3.5 | 6.27 | 2.5 | 6.0 | 1.61 | 1.79 | 2 | 0 | 0.519 E-3 | −0.445 E-5 | 0 | 0 |
|  |  |  |  |  |  |  |  |  |  |  |  |  | 0.349 E-3 | 0.687 E-7 | 0.224 E-7 | 0 |
| 31 | 50.00 | −17.32 | 9.09 | −21.92 | 3.5 | 10.88 | 2.5 | 6.0 | 1.61 | 1.79 | 2 | 0 | 0.246 E-3 | 0.323 E-5 | 0 | 0 |
|  |  |  |  |  |  |  |  |  |  |  |  |  | 0.204 E-3 | 0.113 E-6 | 0.561 E-8 | 0 |
| 32 | 10.00 | 76.69 | 9.09 | −68.03 | 3.5 | 7.16 | 2.5 | 6.0 | 1.61 | 1.79 | 4 | 0 | 0.335 E-3 | −0.197 E-5 | 0 | 0 |
|  |  |  |  |  |  |  |  |  |  |  |  |  | 0.264 E-3 | −0.377 E-6 | 0.122 E-7 | 0 |
| 33 | 20.00 | −43.51 | 20.0 | −14.05 | 3.5 | 6.66 | 2.5 | 8.0 | 1.61 | 1.79 | 2 | 0 | 0.217 E-3 | −0.56 E-6 | 0 | 0 |
|  |  |  |  |  |  |  |  |  |  |  |  |  | 0.295 E-3 | 0.680 E-6 | 0.288 E-7 | 0 |
| 34 | 8.7 | 28.09 | 9.09 | −177.9 | 3.5 | 6.07 | 2.5 | 4.0 | 1.61 | 1.79 | 4 | 0 | 0.141 E-3 | −0.339 E-6 | 0 | 0 |
|  |  |  |  |  |  |  |  |  |  |  |  |  | 0.264 E-3 | −0.24 E-6 | 0.388 E-7 | −0.2 E-9 |
| 35 | 9.43 | −55.23 | 9.09 | −90.43 | 3.5 | 7.78 | 2.5 | 4.0 | 1.61 | 1.79 | 2 | 0 | −0.293 E-4 | −0.442 E-5 | 0 | 0 |
|  |  |  |  |  |  |  |  |  |  |  |  |  | 0.322 E-3 | −0.177 E-5 | 0.25 E-7 | −0.1 E-9 |
| 36 | 14.29 | 82.09 | 10.0 | −28.32 | 1.5 | 9.63 | 1.5 | 8.0 | 1.61 | 1.79 | 3 | 0 | −0.910 E-4 | −0.153 E-7 | 0 | 0 |
|  |  |  |  |  |  |  |  |  |  |  |  |  | 0.170 E-3 | 0.423 E-6 | 0.161 E-7 | 0 |
| 37 | 11.11 | −141.85 | 9.09 | −71.37 | 1.5 | 8.87 | 1.5 | 6.0 | 1.61 | 1.79 | 2 | 0 | −0.192 E-3 | −0.149 E-5 | 0 | 0 |
|  |  |  |  |  |  |  |  |  |  |  |  |  | 0.19 E-3 | −0.635 E-6 | 0.1 E-7 | 0 |
| 38 | 8.33 | 89.51 | 16.67 | −26.6 | 3.5 | 5.48 | 2.5 | 6.0 | 1.61 | 1.79 | 2 | 0 | −0.148 E-3 | −0.341 E-5 | 0 | 0 |
|  |  |  |  |  |  |  |  |  |  |  |  |  | 0.348 E-3 | −0.111 E-5 | 0.328 E-7 | −0.3 E-9 |
| 39 | 20.00 | −34.29 | 9.09 | −23.23 | 3.5 | 9.87 | 2.5 | 6.0 | 1.61 | 1.79 | 3 | 0 | −0.17 E-3 | −0.635 E-5 | 0 | 0 |
|  |  |  |  |  |  |  |  |  |  |  |  |  | 0.178 E-3 | 0.134 E-6 | 0.209 E-7 | 0 |
| 40 | 9.43 | 25.15 | 11.11 | −82.02 | 3.5 | 6.21 | 2.5 | 6.0 | 1.79 | 1.89 | 2 | 0 | −0.221 E-3 | −0.397 E-5 | 0 | 0 |
|  |  |  |  |  |  |  |  |  |  |  |  |  | 0.236 E-3 | −0.452 E-8 | 0.178 E-7 | 0 |
| 41 | 9.43 | −33.61 | 9.09 | −12.56 | 3.5 | 7.06 | 2.5 | 5.0 | 1.51 | 1.51 | 2 | 0 | −0.14 E-3 | −0.238 E-5 | 0 | 0 |
|  |  |  |  |  |  |  |  |  |  |  |  |  | 0.387 E-3 | −0.15 E-5 | 0.27 E-7 | 0 |
| 42 | 9.43 | 46.17 | 9.09 | −55.72 | 3.5 | 7.15 | 2.5 | 6.0 | 1.61 | 1.79 | 3 | 0 | −0.349 E-3 | −0.185 E-4 | 0 | 0 |
|  |  |  |  |  |  |  |  |  |  |  |  |  | 0.276 E-3 | −0.123 E-6 | 0.223 E-7 | 0 |
|  |  |  |  |  |  |  |  |  |  |  |  |  | −0.161 E-3 | −0.342 E-5 | 0 | 0 |

TABLE 3

| Example | 1 | 2 | 3 | 4 | 5 | 6 |
|---|---|---|---|---|---|---|
| R1 | 22.19 | 20.00 | 19.23 | 20.00 | 33.33 | 20.83 |
| R2 | −16.39 | −27.10 | −20.61 | −18.09 | −11.61 | −16.82 |
| R3 | 16.67 | 16.67 | 16.67 | 12.5 | 100.00 | 16.67 |
| R4 | −22.0 | −18.57 | −17.17 | −61.03 | −13.15 | −17.07 |
| R5 | 12.5 | 12.5 | 8.33 | 12.5 | 12.5 | 12.5 |
| R6 | −88.05 | 45.56 | 21.47 | −39.96 | −39.96 | 61.08 |
| l1 | 3.5 | 3.5 | 3.5 | 3.5 | 3.5 | 3.5 |
| l2 | 7.4 | 6.14 | 7.72 | 7.38 | 7.3 | 7.27 |
| l3 | 2.5 | 2.5 | 2.5 | 2.5 | 2.5 | 2.5 |
| l4 | 0.2 | 0.2 | 0.2 | 0.2 | 0.2 | 0.2 |
| l5 | 2.0 | 2.0 | 2.0 | 2.0 | 2.0 | 2.0 |
| s' | 4.57 | 6.0 | 4.5 | 4.5 | 4.5 | 4.5 |
| n1 | 1.61 | 1.61 | 1.61 | 1.61 | 1.61 | 1.61 |
| n3 | 1.51 | 1.51 | 1.51 | 1.51 | 1.51 | 1.51 |
| n5 | 1.51 | 1.51 | 1.51 | 1.51 | 1.51 | 1.51 |
| aspher. surface R | 1 | 1 | 1 | 1 | 1 | 1 |
| K | −20.318 | −20.0 | −20.0 | −20.0 | −20.0 | −20.0 |
| AC4 | 0 | 0.116 E-3 | 0.15 E-3 | 0.11 E-3 | −0.284 E-3 | 0.461 E-3 |
| AC6 | −0.359 E-5 | −0.545 E-5 | −0.679 E-5 | −0.61 E-5 | −0.706 E-6 | −0.511 E-5 |
| AC8 | 0.33 E-7 | 0.485 E-7 | 0.769 E-7 | 0.76 E-7 | −0.397 E-8 | 0.569 E-7 |
| AC10 | 0 | 0 | 0 | 0 | 0 | 0 |

| Example | 7 | 8 | 9 | 10 | 11 | 12 |
|---|---|---|---|---|---|---|
| R1 | 28.46 | 20.46 | 28.46 | 16.13 | 16.67 | 20.00 |
| R2 | −16.98 | −14.17 | −35.61 | 195.38 | −35.03 | −13.77 |
| R3 | 16.67 | 16.67 | 16.67 | 16.67 | 16.67 | 16.67 |
| R4 | −19.72 | −23.48 | −46.27 | −15.05 | −21.4 | −406.33 |
| R5 | 12.5 | 12.5 | 12.5 | 12.5 | 12.50 | 10.0 |
| R6 | 327.48 | −39.96 | 38.95 | 41.36 | −62.16 | −18.38 |
| l1 | 5.0 | 3.5 | 3.5 | 3.5 | 3.5 | 3.5 |
| l2 | 5.93 | 7.76 | 8.8 | 4.79 | 6.91 | 7.44 |
| l3 | 4.0 | 2.5 | 2.5 | 2.5 | 2.5 | 2.5 |
| l4 | 0.2 | 0.2 | 0.2 | 0.2 | 0.2 | 0.2 |
| l5 | 3.0 | 2.0 | 2.0 | 2.0 | 2.0 | 2.0 |
| s' | 4.5 | 4.5 | 4.5 | 5.0 | 3.0 | 3.7 |
| n1 | 1.61 | 1.61 | 1.79 | 1.61 | 1.61 | 1.61 |
| n3 | 1.51 | 1.51 | 1.79 | 1.51 | 1.51 | 1.51 |
| n5 | 1.51 | 1.51 | 1.79 | 1.51 | 1.51 | 1.51 |
| aspher. surface R | 1 | 1 | 1 | 1 | 1 | 1 |
| K | −20.0 | −20.0 | −20.0 | 0 | 0 | −20.0 |
| AC4 | −0.101 E-3 | −0.149 E-3 | −0.218 E-3 | −0.169 E-3 | −0.135 E-3 | 0.428 E-3 |
| AC6 | −0.119 E-5 | −0.107 E-5 | −0.108 E-5 | −0.11 E-5 | −0.418 E-6 | −0.619 E-5 |
| AC8 | 0.249 E-9 | 0.669 E-9 | 0.314 E-8 | −0.215 E-7 | −0.685 E-8 | 0.8 E-7 |
| AC10 | 0 | 0 | 0 | 0 | 0 | 0 |

E-3 means $10^{-3}$ wherein R equals the radius of curvature of the lens surface with the numerals thereafter denoting which surface in said direction of incidence; l indicating the spacing between lens surfaces along a center line in said direction of incidences with the numeral 1 being the distance between the first and second lens surface, numeral 2 between the second and third lens surfaces, and numeral 3 between the third and fourth lens surface; s' being the intercept length; n is the index of refraction of the lens material with the numeral 1 designating the lens material between lens surfaces 1 and 2, and numeral 3 designating the lens material between lens surfaces 3 and 4; and wherein K, AC4, AC6, AC8 and AC10 are spherical coefficients used to determine a meniscus height of an aspherical surface represented by the following equation wherein $$\text{meniscus height} = \phi h^2 (1 + \sqrt{1 - (k + 1)g^2 k^2}) + AC4'h^4 + AC6'h^6 + AC8'h^8 + AC10'h^{10}$$

and wherein h is a distance of a surface point from an optical axis and is $\phi$ a surface vertex.

13. A scanning objective characterized by two lens means with positive power of refraction which both have an aspherical surface which are so constructed that in comparison with a spherical surface with the same vertex radius of curvature, the thickness of the lens means increases toward the outside, and in which the respective surface on the side of the larger intercept length is more strongly curved and wherein an outer diameter of the first lens is reduced by about one-half, the deviation of the aspherical surface from a spherical surface with the same vertex radius of curvature (Δ surface distance measured in the direction of the optical axis) is reduced by more than a factor of 4, and in that this factor decreases from the outside toward the inside.

14. A scanning objective according to claim 13, characterized in that the factor by which the deviation of the aspherical surface from a spherical surface with the same vertex radius of curvature is reduced lies for a space between an edge and half-diameter of the first lens between about 8 and 80 and for a space between a half and quarter diameter of the first lens between 5 and 50.

15. A scanning objective characterized by two lens means with positive power of refraction which both have an aspherical surface which are so constructed that in comparison with a spherical surface with the same vertex radius of curvature, the thickness of the lens means increases toward the outside, and in which the respective surface on the side of the larger intercept length is more strongly curved and wherein the following values for the relative deviation $\Delta z$ of the aspherical surface from a spherical surface with the same vertex radius of curvature:

| h | 0.1 | 0.2 | 0.3 | 0.4 | 0.5 | 0.6 |
|---|---|---|---|---|---|---|
| $\Delta z$ | 0.005 | 0.03 | 0.11 | 0.4 | 1.0 | 2.2 | whereby the focal distance f as well as the relative deviation $\Delta z$ ($\Delta$ surface distance measured in the direction of the optical axis) is normalized to 1 with a distance h from the optical axis of 0.5.

16. A scanning objective characterized by two optical members with positive power of refraction, of which the first member as viewed in the direction of incidence of the beam consists of a lens means which has an aspherical surface so constructed that in comparison with a spherical surface having the same vertex radius of curvature, the thickness of the lens means increases toward the outside, and in that the second optical element consists of two lens means and wherein an outer diameter of the first lens is reduced by about one-half, the deviation of the aspherical surface from a spherical surface with the same vertex radius of curvature ($\Delta$ surface distance measured in the direction of the optical axis) is reduced by more than a factor of 4, and in that this factor decreases from the outside toward the inside.

17. A scanning objective according to claim 16, characterized in that the factor by which the deviation of the aspherical surface from a spherical surface with the same vertex radius of curvature is reduced lies for a space between an edge and half-diameter of the first lens between about 8 and 80 and for a space between a half and quarter diameter of the first lens between 5 and 50.

18. A scanning objective characterized by two optical members with positive power of refraction, of which the first member as viewed in the direction of incidence of the beam consists of a lens means which has an aspherical surface so constructed that in comparison with a spherical surface having the same vertex radius of curvature, the thickness of the lens means increases toward the outside, and in the second optical element consists of two lens means and wherein the following values for the relative deviation $\Delta z$ of the aspherical surface from a spherical surface with the same vertex radius of curvature:

| h | 0.1 | 0.2 | 0.3 | 0.4 | 0.5 | 0.6 |
|---|---|---|---|---|---|---|
| $\Delta z$ | 0.005 | 0.03 | 0.11 | 0.4 | 1.0 | 2.2 | whereby the focal distance f as well as the relative deviation $\Delta z$ ($\Delta$ surface distance measured in the direction of the optical axis) is normalized to 1 with a distance h from the optical axis of 0.5.

* * * * *